United States Patent
Greetham et al.

(10) Patent No.: US 9,859,824 B2
(45) Date of Patent: Jan. 2, 2018

(54) DRIVE CIRCUIT FOR A BRUSHLESS MOTOR HAVING AN AC/AC BOOST CONVERTER

(71) Applicant: Dyson Technology Limited, Wiltshire (GB)

(72) Inventors: Stephen Greetham, Gloucester (GB); Andrew Charlton Clothier, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 15/028,344

(22) PCT Filed: Oct. 7, 2014

(86) PCT No.: PCT/GB2014/053010
§ 371 (c)(1),
(2) Date: Apr. 8, 2016

(87) PCT Pub. No.: WO2015/052497
PCT Pub. Date: Apr. 16, 2015

(65) Prior Publication Data
US 2016/0261214 A1    Sep. 8, 2016

(30) Foreign Application Priority Data
Oct. 8, 2013  (GB) .................................. 1317749.8

(51) Int. Cl.
*H02P 6/14* (2016.01)
*H02M 5/293* (2006.01)

(52) U.S. Cl.
CPC .............. *H02P 6/14* (2013.01); *H02M 5/293* (2013.01)

(58) Field of Classification Search
CPC ....................................................... H02P 6/14
(Continued)

(56) References Cited

U.S. PATENT DOCUMENTS 4,168,477 A    9/1979    Burchall
6,642,683 B1 *  11/2003   Atmur ...................... H02J 3/40
                                              318/400.09

(Continued)

FOREIGN PATENT DOCUMENTS

EP    2 523 325    11/2012
GB    2 455 128    6/2009
(Continued)

OTHER PUBLICATIONS

Search Report dated Feb. 21, 2014, directed to GB Application No. 1317749.8; 1 page.
(Continued)

*Primary Examiner* — David S Luo
(74) *Attorney, Agent, or Firm* — Morrison & Foerster LLP

(57) ABSTRACT

An AC/AC boost converter comprising input terminals, output terminals, an inductor, a bridge arm comprising a pair of bi-directional switches, a capacitor and a control circuit for controlling the switches. The bridge arm and the capacitor are connected in parallel across the output terminals. The inductor has a first end connected to one of the input terminals and a second end connected to one of an end and a junction of the bridge arm, the junction being located between the two switches. Another of the input terminals is then connected to the other of the end and the junction of the bridge arm. An AC power supply supplies an AC input voltage at the input terminals, and the control circuit controls the switches of the bridge arm such that an AC output voltage is supplied at the output terminals, the AC output voltage being greater than the AC input voltage.

7 Claims, 10 Drawing Sheets

(58) Field of Classification Search
USPC .................................. 318/400.3, 400.01, 700
See application file for complete search history.

(56) References Cited

U.S. PATENT DOCUMENTS

| | | | |
|---|---|---|---|
| 7,327,587 B2* | 2/2008 | Mhaskar | H02M 5/4585 363/37 |
| 8,091,666 B2* | 1/2012 | Nozawa | B60K 6/365 180/65.265 |
| 2005/0077854 A1 | 4/2005 | Lelkes et al. | |
| 2007/0052397 A1 | 3/2007 | Thompson et al. | |
| 2008/0238377 A1 | 10/2008 | Di Guardo et al. | |
| 2009/0290396 A1 | 11/2009 | Carcouet et al. | |
| 2010/0237812 A1 | 9/2010 | Seki et al. | |
| 2010/0237813 A1 | 9/2010 | Seki et al. | |
| 2013/0020972 A1 | 1/2013 | Ito et al. | |

FOREIGN PATENT DOCUMENTS

| | | |
|---|---|---|
| JP | 2005-117895 | 4/2005 |
| JP | 3902030 | 4/2007 |
| JP | 2010-74869 | 4/2010 |
| JP | 2010-226777 | 10/2010 |
| JP | 2010-226779 | 10/2010 |
| WO | WO-99/38248 | 7/1999 |

OTHER PUBLICATIONS

International Search Report and Written Opinion dated Mar. 20, 2015, directed to International Application No. PCT/GB2014/053010; 8 pages.

* cited by examiner

| Switches | | Condition |
|---|---|---|
| S1 | S2 | |
| Open | Open | Off |
| Closed | Open | Charge Inductor |
| Open | Closed | Charge Capacitor |
| Closed | Closed | Invalid |

(a)

(b)

(a)

(b)

DIR1 = 1
FW = 0
V<sub>OUT</sub> = +ve

DIR2 = 1
FW = 0
V<sub>OUT</sub> = +ve

DIR1 = 1
FW = 0
V<sub>OUT</sub> = -ve

DIR2 = 1
FW = 0
V<sub>OUT</sub> = -ve

| Control Signals | | | Switches | | | | Condition |
|---|---|---|---|---|---|---|---|
| DIR1 | DIR2 | FW | Q1 | Q2 | Q3 | Q4 | |
| 0 | 0 | X | Open | Open | Open | Open | Off |
| 1 | 0 | 0 | Closed | Open | Open | Closed | Excite<br><br>L-to-R when $V_{OUT}$ is +ve<br>R-to-L when $V_{OUT}$ is -ve |
| 0 | 1 | 0 | Open | Closed | Closed | Open | Excite<br><br>R-to-L when $V_{OUT}$ is +ve<br>L-to-R when $V_{OUT}$ is -ve |
| 1 | 0 | 1 | Open | Closed | Open | Closed | Freewheel<br><br>L-to-R when $V_{OUT}$ is +ve<br>R-to-L when $V_{OUT}$ is -ve |
| 0 | 1 | 1 | Open | Closed | Open | Closed | Freewheel<br><br>R-to-L when $V_{OUT}$ is +ve<br>L-to-R when $V_{OUT}$ is -ve |
| 1 | 1 | X | - | - | - | - | Illegal |

Fig. 11

DRIVE CIRCUIT FOR A BRUSHLESS MOTOR HAVING AN AC/AC BOOST CONVERTER

REFERENCE TO RELATED APPLICATIONS

This application is a national stage application under 35 USC 371 of International Application No. PCT/GB2014/053010, filed Oct. 7, 2014, which claims the priority of United Kingdom Application No. 1317749.8, filed Oct. 8, 2013, the entire contents of which are incorporated herein by reference.

FIELD OF THE INVENTION

The present invention relates to a drive circuit for a brushless motor that comprises an AC/AC boost converter.

BACKGROUND OF THE INVENTION

AC/AC boost converters typically comprise an AC/DC converter (e.g. rectifier), followed by a boost circuit, and then a DC/AC converter (e.g. an inverter).

SUMMARY OF THE INVENTION

The present invention provides a drive circuit for a brushless motor, the drive circuit comprising an AC/AC boost converter and an inverter having two or more bridge arms connected in parallel across the output terminals of the converter, each bridge arm of the inverter being connected to a winding of the brushless motor and comprising a pair of bi-directional switches, wherein the AC/AC boost converter comprises input terminals for connection to an AC power supply, output terminals for connection to a load, an inductor, a bridge arm comprising a first switch and a second switch, a capacitor, and a control circuit for controlling the switches of the bridge arm, wherein the bridge arm and the capacitor are connected in parallel across the output terminals, the inductor has a first end connected to one of the input terminals and a second end connected to one of an end and a junction of the bridge arm, the junction being located between the two switches, another of the input terminals is connected to the other of the end and the junction of the bridge arm, the switches of the bridge arm are bi-directional, the AC power supply supplies an AC input voltage at the input terminals, and the control circuit controls the switches of the bridge arm such that an AC output voltage is supplied at the output terminals, the AC output voltage being greater than the AC input voltage.

The converter therefore supplies a boosted AC voltage without the need for an AC/DC converter or a DC/AC converter. The converter therefore has fewer components, which not only reduces the cost but also increases the efficiency of the converter due to reduced power losses.

With this arrangement it is possible to drive an electrically commutated DC motor (e.g. permanent-magnet motor or switched reluctance motor) using an AC power supply without the need for a rectifier or high-capacitance bulk capacitor. Consequently, a potentially cheaper, smaller and/or more efficient drive circuit may be realised.

The control circuit may open and close each of the switches of the bridge arm during each half-cycle of the AC input voltage. That is to say that both the first switch and the second switch are opened and closed during each half-cycle of the AC input voltage. This then contrasts with other types of boost converter in which only one switch of a bridge arm is opened and closed during a particular half-cycle. More particularly, the bridge arm may have a first state in which the first switch is open and the second switch is closed, and a second state in which the first switch is closed the second switch is open. The inductor is then charged by the AC input voltage when the bridge arm is in the first state, and energy from the inductor is transferred to the capacitor (i.e. the capacitor is charged) when the bridge arm is in the second state. The control circuit then controls the switches of the bridge arm such that the bridge arm is toggled between the first state and the second state multiple times during each half-cycle of the AC input voltage. The inductor and the capacitor are therefore charged without the need for additional diode paths, thus reducing the cost of the converter. Additionally, other types of boost converter require current to pass through a body diode of a switch when charging the capacitor. In contrast, with the converter of the present invention, current flows through a closed switch rather than a body diode. As a result, power losses are reduced and thus the efficiency of the converter is improved.

The switches may be gallium nitride switches, which have at least two advantages. First, gallium nitride switches have a relatively high breakdown voltage and are therefore well-suited for operation at mains voltages. Second, gallium nitride switches are capable of relatively high switching frequencies. As a result, an inductor having a relatively low inductance may be used, thereby reducing the cost and size of the converter. Alternatively, the higher switching frequency may be used to reduce the ripple in the current drawn from the AC power supply, thereby improving the power factor of the converter.

The drive circuit may comprise a controller for controlling the switches of the inverter. The controller may then open and close each switch of the inverter multiple times during each half-cycle of the AC output voltage. As a result, the winding is excited with the AC output voltage in both directions (i.e. left-to-right and right-to-left) during both positive and negative half-cycles of the AC output voltage, i.e. the drive circuit is capable of bi-directional current control. Additionally or alternatively, the controller may close a first pair of switches so as to excite a winding of the brushless motor with the AC output voltage during a positive half-cycle of the AC output voltage to thereby drive current through the winding in a particular direction, and the controller may close a second different pair of switches so as to excite the winding with the AC output voltage during a negative half-cycle of the AC output voltage to thereby drive current through the winding in the same particular direction. The drive circuit is therefore able to excite the winding in the same direction during both positive and negative half-cycles of the AC output voltage. Consequently, the drive circuit may be used for uni-directional current control, e.g. if only the first pair of switches are closed during the positive half-cycle of the AC output voltage, and only the second pair of switches are closed during the negative half-cycle of the AC output voltage. Alternatively, the drive circuit may be used for bi-directional current control if both the first pair of switches and the second pair of switches are closed sequentially during each half-cycle of the AC output voltage.

The inverter may comprise two bridge arms only. The drive circuit would then comprise a total of three bridge arms, i.e. the bridge arm of the converter plus the two bridge arms of the inverter. The drive circuit may therefore be implemented using a conventional three-phase inverter topology having bi-directional switches. As a result, the size and/or the cost of the drive circuit may be reduced by employing a commercially available three-phase inverter packaged as a compact module.

BRIEF DESCRIPTION OF THE DRAWINGS

In order that the present invention may be more readily understood, embodiments of the invention will now be described, by way of example, with reference to the accompanying drawings, in which:

FIG. 11 details the allowed states of the switches of the inverter in response to control signals issued by a controller of the motor system.

DETAILED DESCRIPTION OF THE INVENTION

Figures 1, 2:
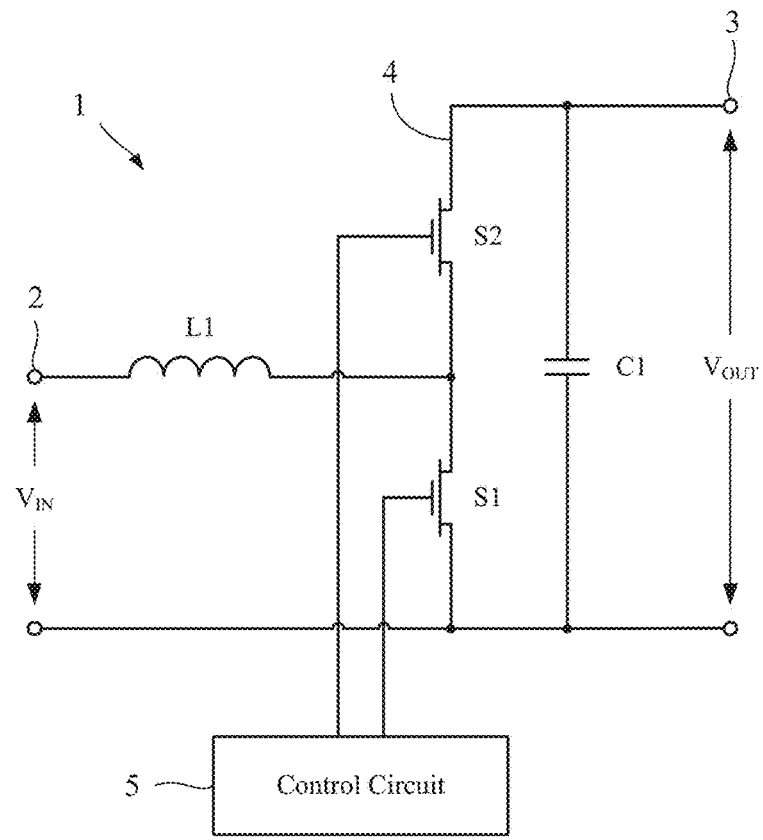
FIG. 1 is a schematic diagram of an AC/AC boost converter in accordance with the present invention.
FIG. 2 details the allowed states of the switches of the converter.

The AC/AC boost converter 1 of FIG. 1 comprises a pair of input terminals 2, a pair of output terminals 3, an inductor L1, a bridge arm 4 comprising a pair of switches S1,S2, a capacitor C1, and a control circuit 5.

The input terminals 2 are intended to be connected to an AC power supply, whilst the output terminals 3 are intended to be connected to a load.

The bridge arm 4 and the capacitor C1 are connected in parallel across the output terminals 3. The switches S1,S2 of the bridge arm 4 are bi-directional and can be controlled in both directions. That is to say that each switch S1,S2 conducts in both directions when closed, and does not conduct in either direction when open. The switches S1,S2 thus differ from, say, a MOSFET having a body diode which, although capable of conducting in both directions, can be made non-conductive in one direction only. The switches S1,S2 are gallium nitride switches, which have a relatively high breakdown voltage and are thus well-suited for operation at mains voltages. Additionally, gallium nitride switches are capable of relatively high switching frequencies, the advantages of which are detailed below. Nevertheless, other types of bi-directional switch that are capable of being controlled in both directions might alternatively be used.

The inductor L1 is connected at one end to one of the input terminals 2, and is connected at the other end to the junction in the bridge arm 4 located between the two switches S1,S2. The other of the input terminals 2 is then connected to an end of the bridge arm 4.

The control circuit 5 controls the opening and closing of the switches S1,S2 of the bridge arm 4. The four possible states of the bridge arm 4 are detailed in FIG. 2. During operation, which is described below in more detail, the AC power supply supplies an AC input voltage, $V_{IN}$, at the input terminals 2. The control circuit 5 then controls the switches S1,S2 of the bridge arm 4 such that an AC output voltage, $V_{OUT}$, is supplied at the output terminals 3, the AC output voltage being greater than the AC input voltage. Additionally, the control circuit 5 controls the switches S1,S2 so as to provide power factor correction.

Figure 3:
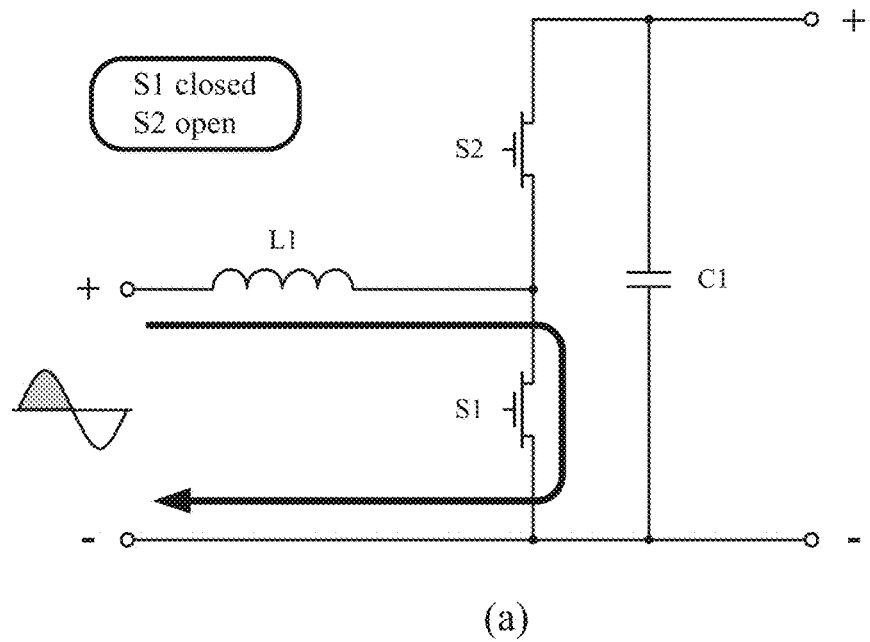
FIG. 3 illustrates the direction of current through the converter when an AC input voltage is positive and (a) the first switch is closed and (b) the second switch is closed.
Figure 3:
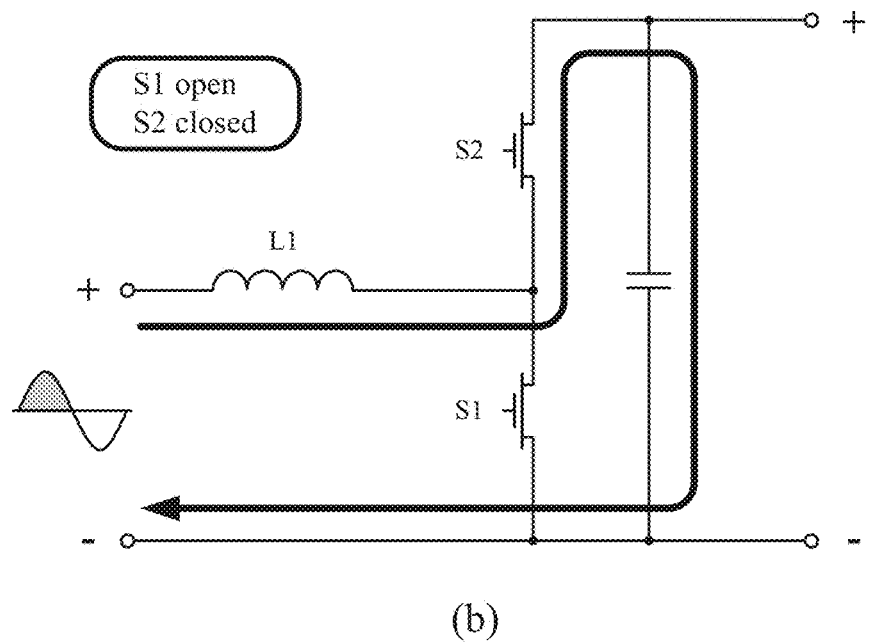

Operation of the converter 1 will now be described with reference to FIGS. 3 and 4. FIG. 3 illustrates operation during a positive half-cycle of the AC input voltage, whilst FIG. 4 illustrates operation during a negative half-cycle.

The control circuit 5 closes the first switch S1 of the bridge arm 4 and opens the second switch S2 so as to place the bridge arm 4 in a first state. This then causes the inductor L1 to be charged, as illustrated in FIGS. 3(a) and 4(a). The control circuit 5 subsequently opens the first switch S1 and closes the second switch S2 so as to place the bridge arm 4 in a second state. This then causes the energy of the inductor L1 to be transferred to the capacitor C1, as illustrated in FIGS. 3(b) and 4(b). The control circuit 5 then repeatedly switches between the first state and the second state during each half-cycle of the AC input voltage.

Figure 4:
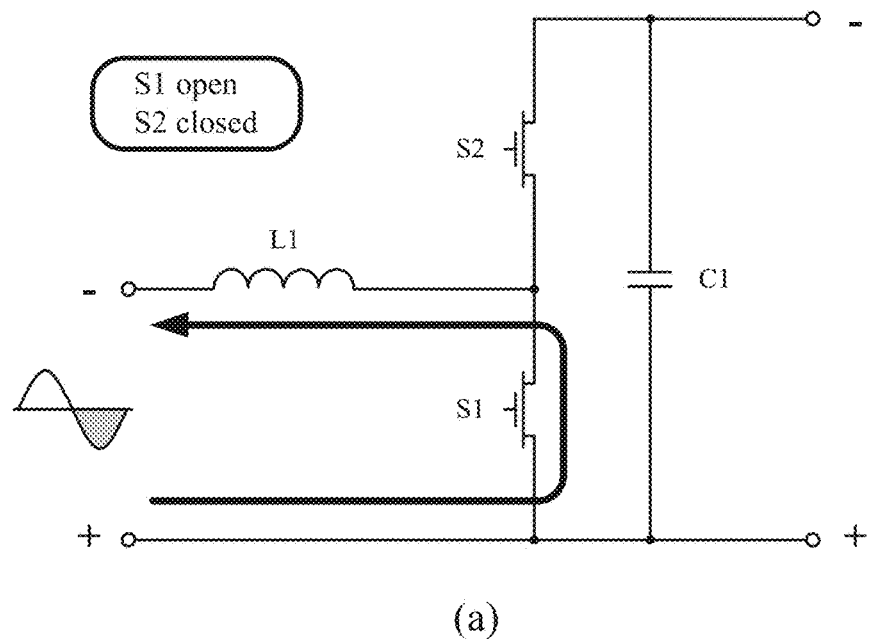
FIG. 4 illustrates the direction of current through the converter when an AC input voltage is negative and (a) the first switch is closed and (b) the second switch is closed.
Figure 4:
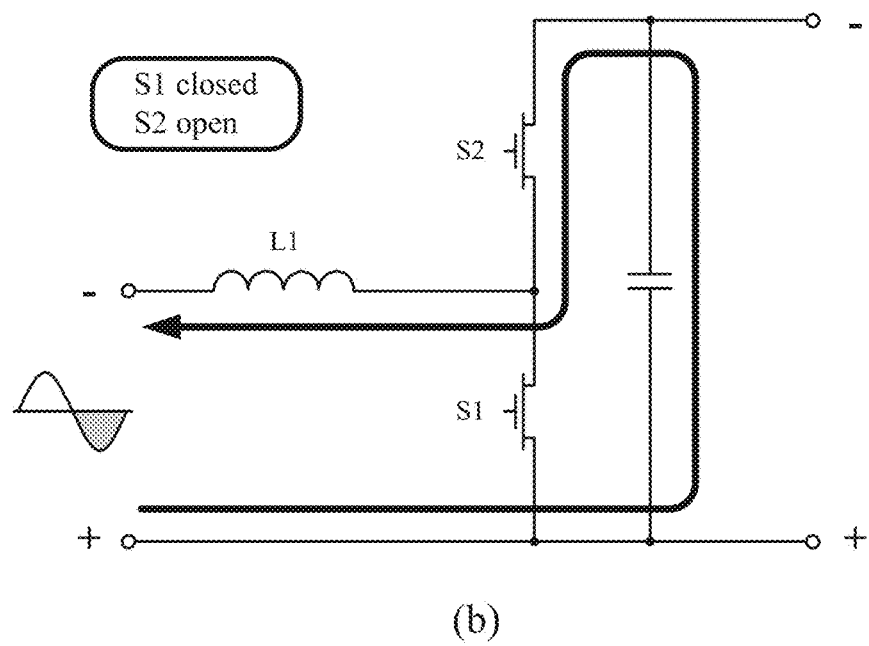

The arrows in FIGS. 3 and 4 illustrate the direction of current through the converter 1. As can be seen in FIG. 3, current flows around the converter 1 in a clockwise direction during a positive half-cycle of AC input voltage. As a result, the top plate of the capacitor C1 is positively charged and thus a positive output voltage is supplied at the output terminals 3. Conversely, as can be seen in FIG. 4, current flows around the converter 1 in a counter-clockwise direction during a negative half-cycle of AC input voltage. As a result, the top plate of the capacitor C1 is negatively charged and thus a negative output voltage is supplied at the output terminals 3. By employing bi-directional switches, the bridge arm 4 is able to charge the inductor L1 when in the first state and charge the capacitor C1 when in the second state irrespective of the polarity of the AC input voltage.

The control circuit 5 controls the length of time spent by the bridge arm 4 in each of the two states so as to provide an AC output voltage, $V_{OUT}$, that is boosted relative to the AC input voltage, $V_{IN}$. Additionally, the control circuit 5 controls the length of time spent in each of the two states so as to provide power factor correction.

Figure 5:
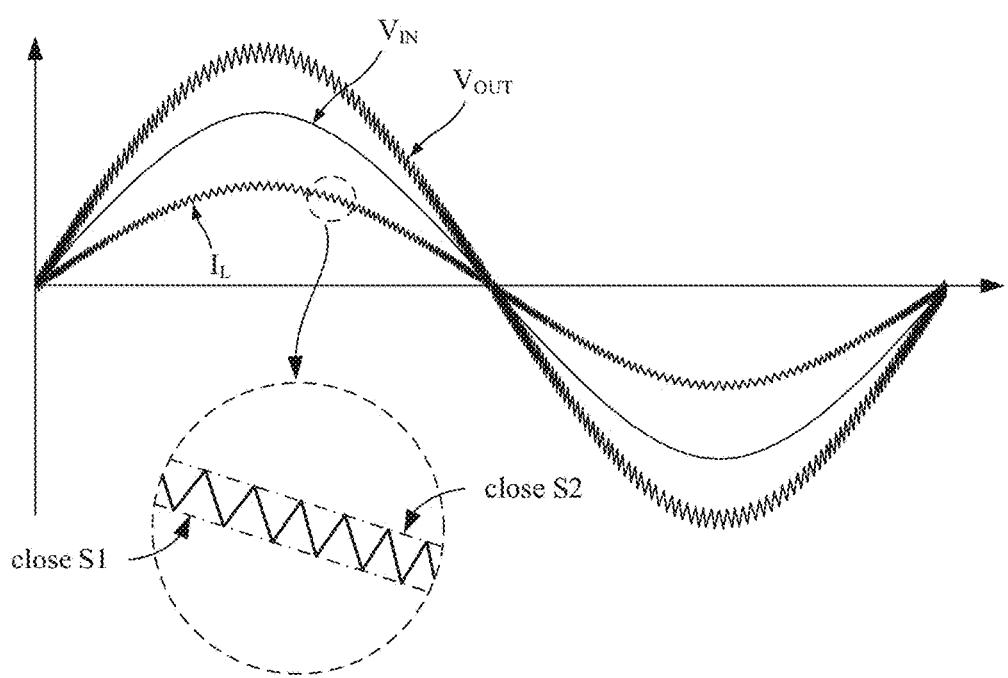
FIG. 5 illustrates the waveforms of an AC input voltage ($V_{IN}$), an AC output voltage ($V_{OUT}$), and the current ($I_L$) flowing through the inductor of the converter.

FIG. 5 illustrates the waveforms of the AC input voltage, $V_{IN}$, the AC output voltage, $V_{OUT}$, and the inductor current, $I_L$, over one cycle. It can be seen that the AC output voltage has the same frequency as that of the AC input voltage. Consequently, in contrast to most conventional AC/AC converters, the converter 1 of the present invention does not adjust the frequency of the voltage. The converter 1 operates in continuous conduction mode and employs hysteresis current control. So, for example, when the inductor current, $I_L$, drops below a lower limit and the AC input voltage, $V_{IN}$, is positive or when the inductor current rises above an upper limit and the AC input voltage is negative, the control circuit 5 closes the first switch S1 and opens the second switch S2 so as to charge the inductor L1. Conversely, when the inductor current rises above the upper limit and the AC input voltage is positive or when the inductor current drops below the lower limit and the AC input voltage is negative, the control circuit 5 opens the first switch S1 and closes the second switch S2 so as to charge the capacitor C1. The inductor current is therefore maintained within a hysteresis band defined by the upper and lower limits Hysteresis current control is a well-known technique employed in AC-DC boost converters. Accordingly, the details of the hardware and the control scheme necessary to implement hysteresis current control will not be described here.

By employing hysteresis current control, the converter 1 draws an input current from the AC power supply that approaches that of a sinusoid, thereby resulting in a good power factor. For a given hysteresis band, the switching frequency employed by the control circuit 5 is determined by the inductance of the inductor L1. Gallium nitride switches are capable of operating at relatively high switching frequencies. As a result, an inductor L1 having a relatively low inductance may be used. This then has the advantage of reducing the cost and size of the converter 1. Alternatively or additionally, the higher switching frequency may be used to reduce the size of the hysteresis band. As a result, the ripple in the input current drawn from the AC power supply may be reduced, thereby improving the power factor of the converter 1.

Figure 6:
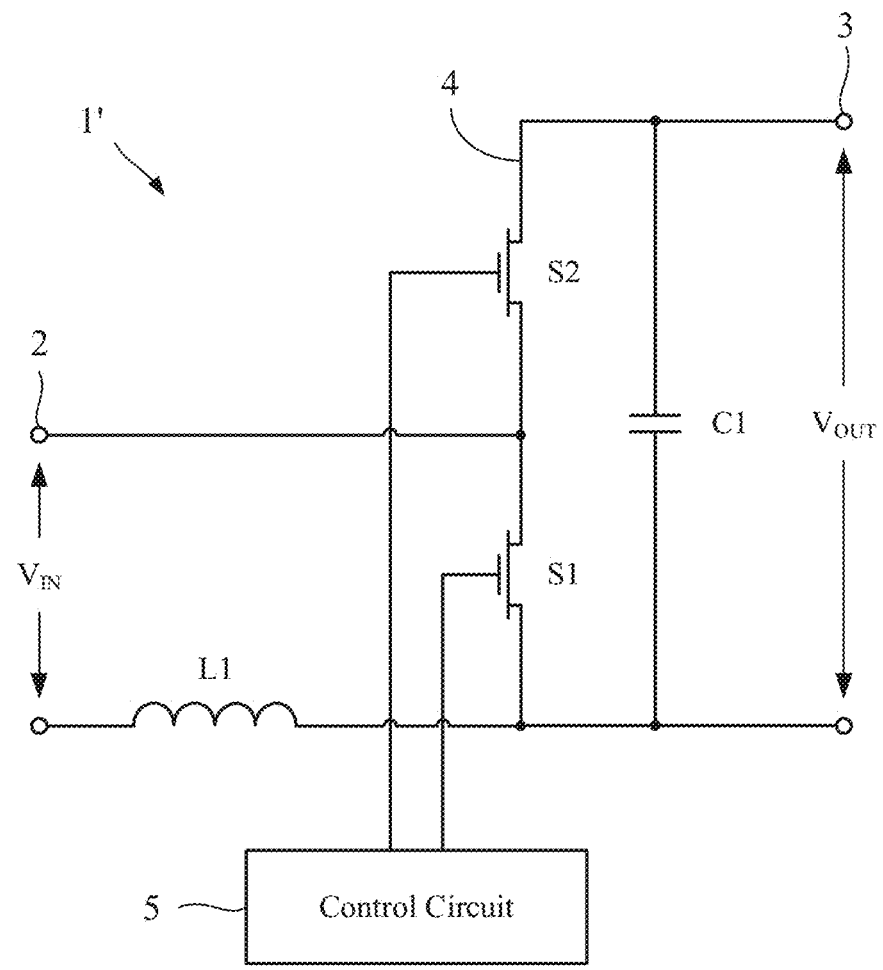
FIG. 6 is a schematic diagram of an alternative AC/AC boost converter in accordance with the present invention.

In the embodiment described above, the inductor L1 is connected at one end to one of the input terminals 2, and is connected at the other end to the junction in the bridge arm 4 located between the two switches S1,S2. The other of the input terminals 2 is then connected to an end of the bridge arm 4. However, as illustrated in FIG. 6, the inductor L1 might equally be connected to an end of the bridge arm 4, and the other of the input terminals 2 might be connected to the junction in the bridge arm 4. Although the position of the inductor L1 has changed, every other aspect of the converter 1 is unchanged from that described above, including the manner in which the control circuit 5 controls the switches S1,S2 of the bridge arm 4. Accordingly, in a more general sense, the inductor L1 may be said to have a first end connected to one of the input terminals 2 and a second end connected to one of an end and a junction of the bridge arm 4. The other of the input terminals 3 is then connected to the other of the end and the junction of the bridge arm 4.

As noted above, the control circuit 5 employs hysteresis current control in order to control the switches S1,S2 of the bridge arm 4. However, other methods of control employed in conventional AC-DC boost converters might equally be employed, such as average current control, critical current control or predictive current control.

Conventional AC/AC boost converters typically comprise an AC/DC converter (e.g. rectifier), followed by a boost circuit, and then a DC/AC converter (e.g. an inverter). In contrast, the AC/AC boost converter 1 of the present invention has neither an AC/DC converter nor a DC/AC converter. The converter 1 therefore has fewer components, which not only reduces the size and cost of the converter 1 but also increases the efficiency of the converter 1 due to reduced power losses.

Bi-directional switches typically default to a closed position when the gate voltage is zero. Consequently, when the converter 1 is initially connected to an AC power supply, the switches S1,S2 of the bridge arm 4 may present a short circuit. The converter 1 may therefore require means for avoiding a short circuit at start up. For example, an additional switch (e.g. MOSFET) may be provided that defaults to an open position and is located in series with the inductor L1. Whilst on the subject of short circuits, it will be appreciated that the control circuit 5 employs a dead time between the opening of one switch and the closing of the other switch of the bridge arm 4 so as to avoid shoot-through.

When a switch S1,S2 of the bridge arm 4 is opened, the sudden change in current through the switch gives rise to a voltage transient that could exceed the rating of the switch. Accordingly, the bridge arm 4 may comprise means for protecting the switches S1,S2 against excessive transients. For example, the bridge arm 4 may comprise a snubber connected in parallel with each of the switches S1,S2.

An application of the AC/AC boost converter 1 will now be described with reference to FIGS. 7 and 8.

Figure 7:
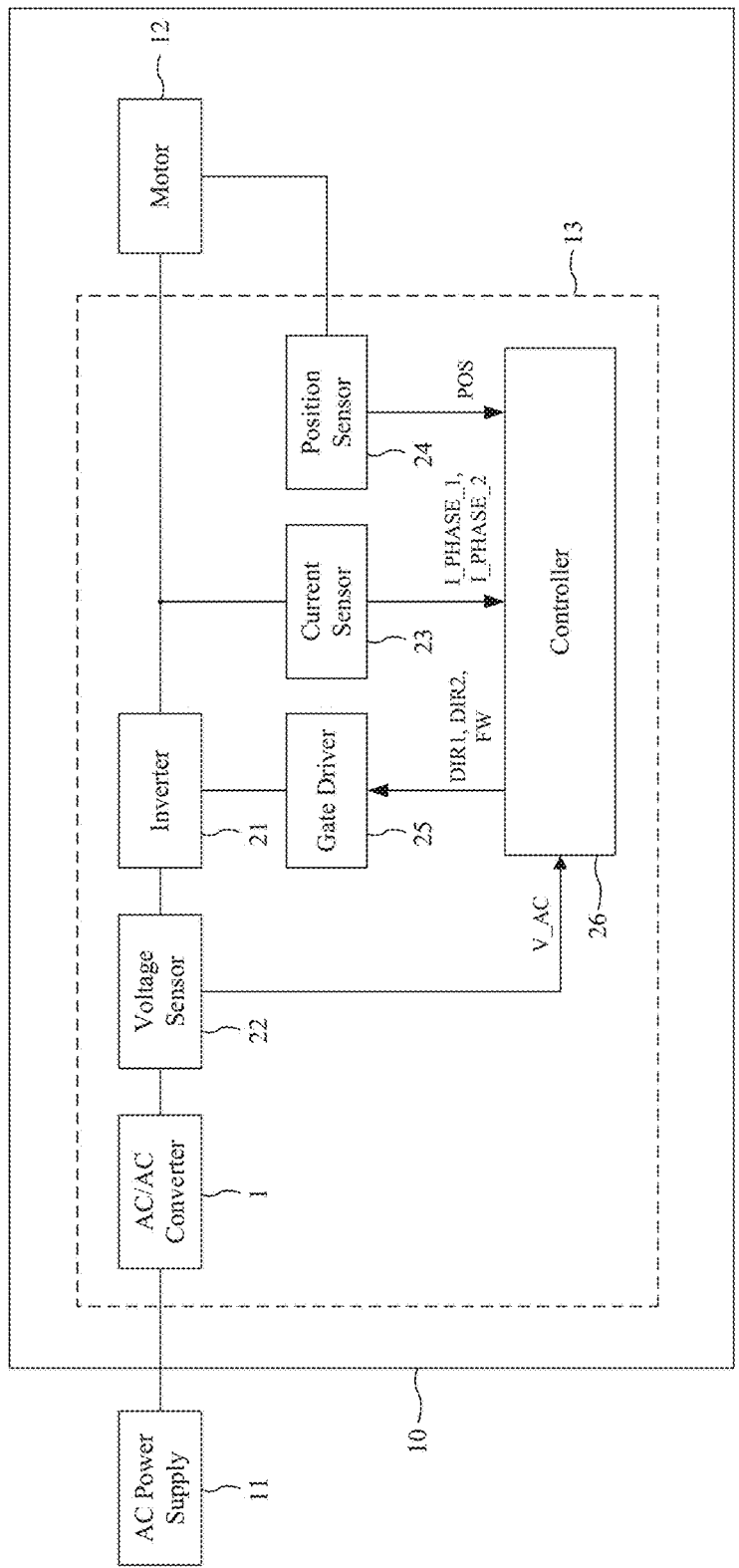
FIG. 7 is a block diagram of a motor system in accordance with the present invention, the motor system incorporating the converter of FIG. 1.
Figure 8:
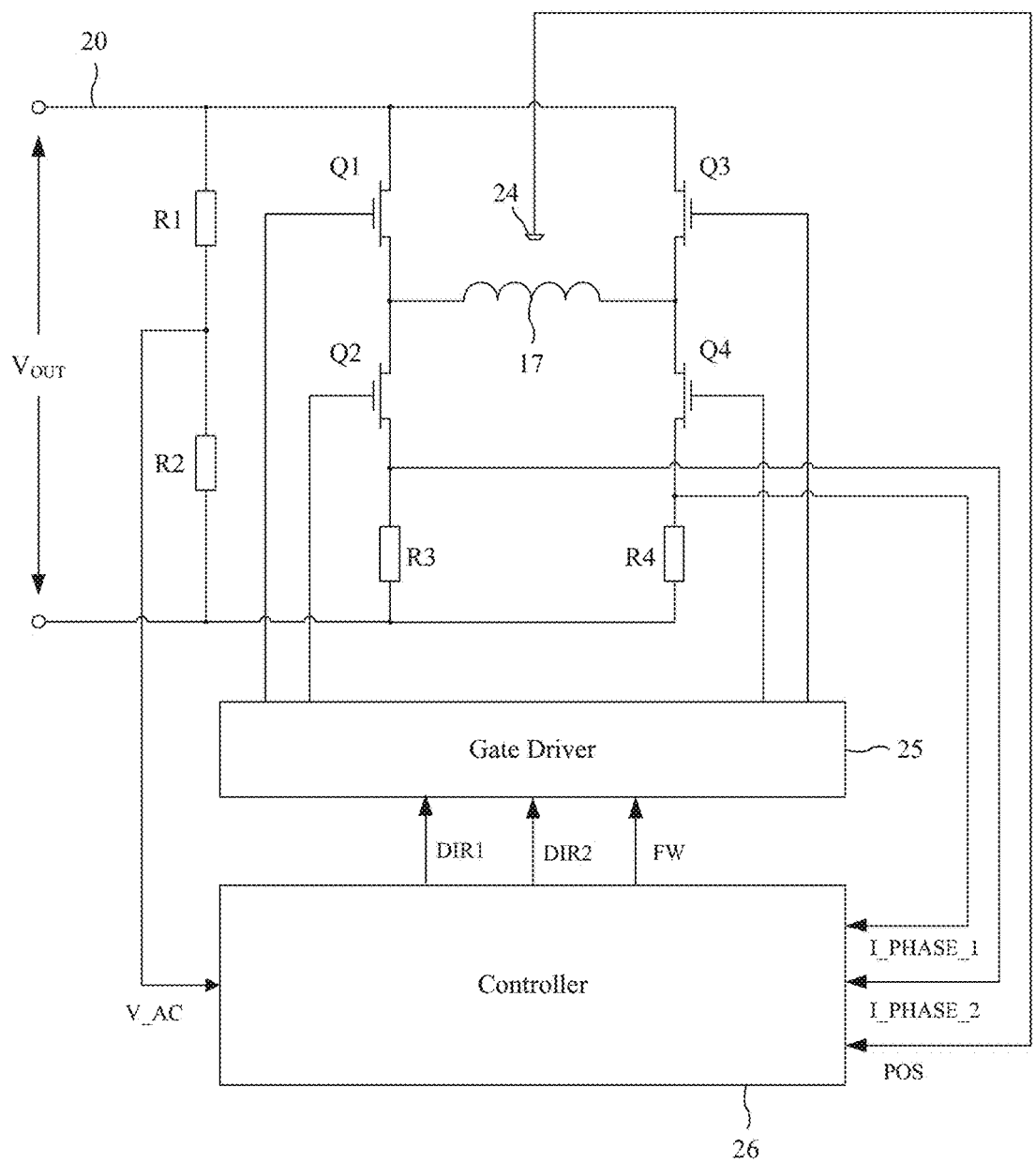
FIG. 8 is a schematic diagram of part of the motor system.

FIGS. 7 and 8 illustrate a motor system 10 powered by an AC power supply 11, such as a domestic mains supply. The motor system 10 comprises a brushless motor 12 and a drive circuit 13.

The drive circuit 13 comprises the AC/AC boost converter 1, a pair of power lines 20, an inverter 21, a voltage sensor 22, a current sensor 23, a position sensor 24, a gate driver 25, and a controller 26.

The power lines 20 are connected to the output terminals 3 of the AC/AC converter 1.

The inverter 21 comprises two bridge arms connected in parallel across the power lines 20. Each arm comprises two bi-directional switches Q1,Q2 and Q3,Q4 that can be controlled in both directions. Each bridge arm is connected to an end of a phase winding 17 of the motor 12. As with the AC/AC converter 1, the switches Q1-Q4 of the inverter 21 are gallium nitride switches, which have a relatively high breakdown voltage and are thus well-suited for operation at mains voltages. However, other types of bi-directional switch that are capable of being controlled in both directions might alternatively be used.

The voltage sensor 22 comprises a pair of resistors R1,R2 arranged as a potential divider across the power lines 20. The voltage sensor 22 outputs to the controller 26 a signal, V_AC, that represents a scaled-down measure of the AC output voltage, $V_{OUT}$, supplied by the converter 1.

The current sensor 23 comprises a pair of shunt resistors R3,R4, each resistor being located on a bridge arm of the inverter 21. The voltages across the shunt resistors R3,R4 are output to the controller 26 as current signals, I_PHASE_1 and I_PHASE_2. The signals provide a measure of the current in the phase winding 17 during both excitation and freewheeling, as explained below in more detail.

The position sensor 24 senses the angular position of a rotor of the motor 12 and outputs to the controller 26 a signal, POS. By way of example, the position sensor 24 may take the form of a Hall-effect sensor or an optical encoder.

The gate driver 25 drives the opening and closing of the switches Q1-Q4 in response to control signals from the controller 26.

The controller 26 is responsible for controlling the operation of the motor system 10. In response to input signals received from the voltage sensor 22, the current sensor 23 and the position sensor 24, the controller 26 generates and outputs three control signals: DIR1, DIR2 and FW.

DIR1 and DIR2 are drive signals that are used to excite the phase winding 17 with the AC output voltage, $V_{OUT}$, supplied by the converter 1. When DIR1 is pulled logically high and DIR2 is pulled logically low, the gate driver 25 closes switches Q1 and Q4, and opens switches Q2 and Q3. Conversely, when DIR2 is pulled logically high and DIR1 is pulled logically low, the gate driver 25 opens switches Q1 and Q4, and closes switches Q2 and Q3. In the event that both DIR1 and DIR2 are pulled low, all switches Q1-Q4 of the inverter 21 are opened.

Figure 9:
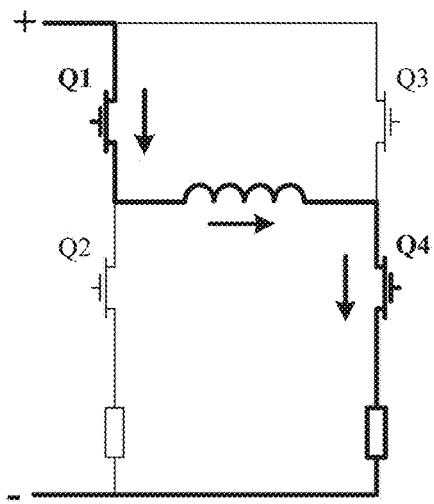
FIG. 9 illustrates the direction of current through an inverter and a phase winding of the motor system during excitation.
Figure 9:
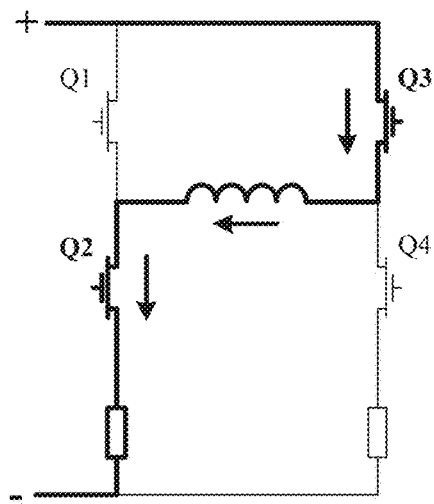
Figure 9:
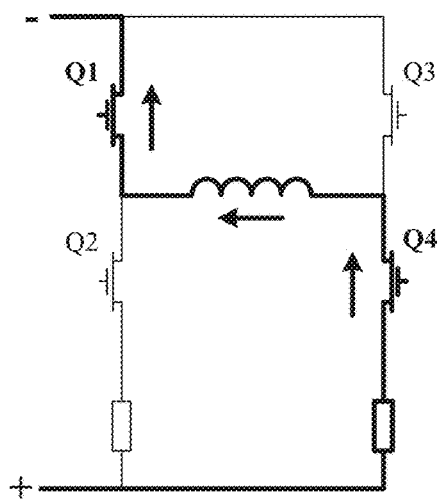
Figure 9:
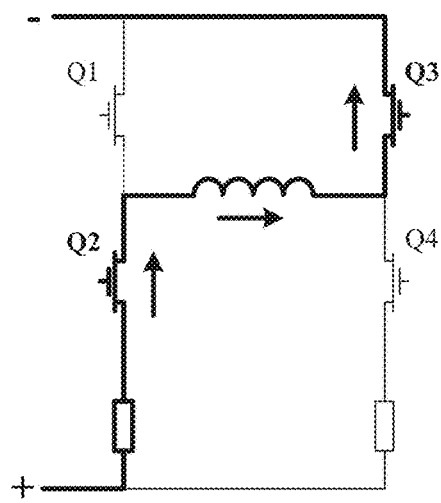

FIG. 9 illustrates the direction of current through inverter 21 and the phase winding 17 during excitation. It can be seen that when DIR1 is pulled high and the AC output voltage, $V_{OUT}$, is positive or when DIR2 is pulled high and the AC output voltage, $V_{OUT}$, is negative, current is driven through the phase winding 17 in a direction from left to right. Conversely, when DIR1 is pulled high and the AC output voltage, $V_{OUT}$, is negative or when DIR2 is pulled high and the AC output voltage, $V_{OUT}$, is positive, current is driven through the phase winding 17 in a direction from right to left.

The phase winding 17 is commutated by reversing the direction of current through the phase winding 17. Commutation therefore generally involves reversing DIR1 and DIR2. However, at a zero-crossing in the AC output voltage (i.e. where the polarity of the voltage changes), commutation will involve leaving DIR1 and DIR2 unchanged.

FW is a freewheel signal that is used to disconnect the phase winding 17 from the AC output voltage, $V_{OUT}$, and allow current in the phase winding 17 to freewheel around the low-side loop of the inverter 21. When FW is pulled logically high, the gate driver 25 opens both high-side switches Q1 and Q3, and closes both low-side switches Q2 and Q4.

Figure 10:
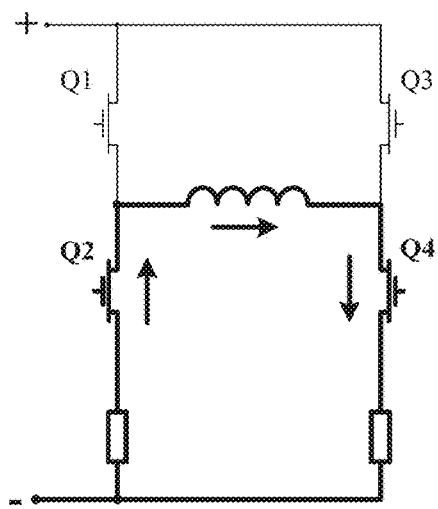
FIG. 10 illustrates the direction of current through the inverter and the phase winding during freewheeling.
Figure 10:
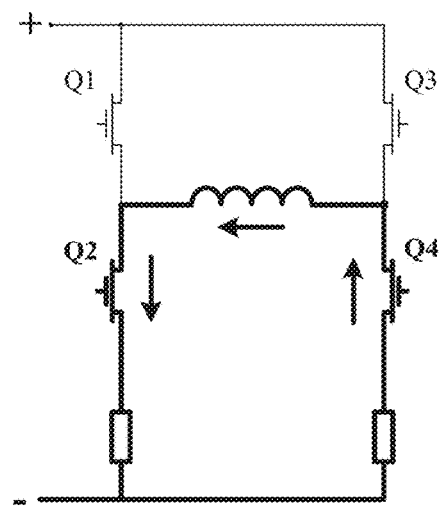
Figure 10:
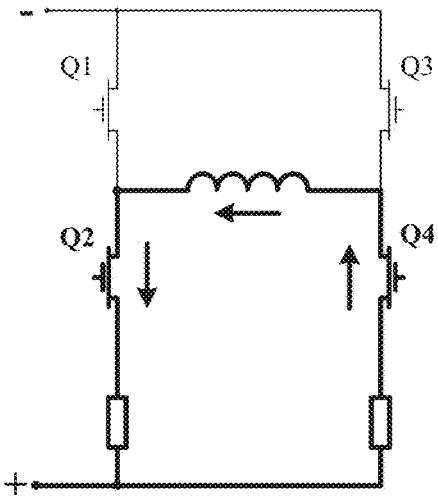
Figure 10:
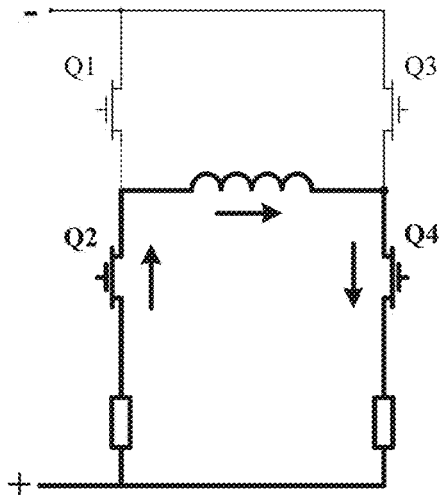

FIG. 10 illustrates the direction of current around the inverter 21 and through the phase winding 17 during freewheeling. It can be seen that when FW and DIR1 are pulled high and the AC output voltage, $V_{OUT}$, is positive or when FW and DIR2 are pulled high and the AC output voltage, $V_{OUT}$, is negative, current freewheels around the low-side loop of the inverter 21 in a clockwise direction. Conversely, when FW and DIR1 are pulled high and the AC output voltage, $V_{OUT}$, is negative or when FW and DIR2 are pulled high and the AC output voltage, $V_{OUT}$, is positive, current freewheels around the low-side loop of the inverter 21 in a counter-clockwise direction. Current therefore freewheels around the inverter 21 in a direction defined by DIR1, DIR2 and the polarity of the AC output voltage, $V_{OUT}$.

FIG. 11 summarises the possible states of the switches Q1-Q4 in response to the control signals of the controller 26.

As noted above, the converter 1 employs a dead time between the opening and closing of the switches S1,S2 so as to prevent shoot-through. Additionally, the converter 1 may comprise means (e.g. snubbers) for protecting the switches S1,S2 against excessive voltage transients. Similarly, the controller 26 employs a dead time between the opening and closing of switches Q1-Q4 on the same arm of the inverter 21 so as to prevent shoot-through. So, for example, when switching from DIR1 to DIR2, the controller 26 first pulls DIR1 low, waits for the dead time, and then pulls DIR2 high. Additionally, the inverter 21 may comprise means (e.g. snubbers) for protecting the switches Q1-Q4 against excessive transients.

The particular manner in which the brushless motor 12 is controlled by the drive circuit 13 is not pertinent to the present invention. That is to say that the times at which the phase winding 17 is commutated, excited and freewheeled are not important. A suitable scheme for controlling the brushless motor 12 is described in WO2011/128659. As far as the motor system 10 is concerned, the present invention resides in the synergy that arises from employing the AC/AC boost converter 1 described above in combination with an inverter 21 having bi-directional switches. As a result of this arrangement, it is possible to power an electrically commutated DC motor (e.g. permanent-magnet motor or switched reluctance motor) using an AC power supply without the need for a rectifier or high-capacitance bulk capacitor. Consequently, a potentially cheaper, smaller and/or more efficient drive circuit 13 may be realised. Moreover, it will be noted that the drive circuit 13 comprises three bridge arms, each bridge arm comprising two bi-directional switches. The first bridge arm 4 forms part of the AC/AC boost converter 1, whilst the second and third bridge arms form part of the inverter 21. The three bridge arms 4,21 are arranged in parallel and thus have the same topology as that of a conventional three-phase inverter. Accordingly, the size and/or the cost of the drive circuit 13 may be reduced by employing a commercially available three-phase inverter packaged as a compact module.

The voltage sensor 22 provides the controller 26 with a measure of both the polarity and the magnitude of the AC output voltage, $V_{OUT}$, supplied by the converter 1. The polarity is used by the controller 26 to determine which of the switches Q1-Q4 should be opened and closed in order to drive current through the phase winding 17 in a particular direction. The magnitude of the voltage may be used by the controller 26 to control the times at which the phase winding 17 is commutated, excited and/or freewheeled. In the event that the magnitude of the AC output voltage is not used by the controller 26, other means for measuring the polarity of the AC output voltage may be employed. For example, the voltage sensor 22 may take the form of a zero-cross detector (e.g. pair of clamping diodes) that outputs a digital signal that is high when the AC output voltage is positive and is low when the AC output voltage is negative.

The current sensor 23 provides the controller 26 with a measure of the current in the phase winding 17. The controller 26 is then able to use this information to avoid excessive currents, which might otherwise damage components of the motor 12 or the drive circuit 13. For example, the controller 26 may freewheel the phase winding 17 whenever the phase current exceeds a predefined limit By locating a shunt resistor R3,R4 on the lower part of each arm of the inverter 21, the current sensor 23 is able to provide a measure of the phase current during excitation and freewheeling. The controller 26 is then able to employ hysteresis current control, i.e. the controller 26 may freewheel the phase winding 17 whenever the phase current exceeds an upper limit, and excite the phase winding 17 whenever the phase current drops below a lower limit Although the current sensor 23 comprises a pair of shunt resistors R3,R4, conceivably the current sensor 23 may comprise a single shunt resistor that is sensitive to the phase current during excitation only. In this alternative embodiment, the controller 26 may freewheel the phase winding 17 for a set period of time whenever the phase current exceeds an upper limit. As a further alternative, the current sensor 23 may comprise a current transformer or other transducer that is capable of sensing the phase current during both excitation and freewheeling. Moreover, the current sensor 23 may be omitted altogether and the controller 26 may use a PWM signal to excite and freewheel the phase winding 17.

The controller 26 freewheels the phase winding 17 by opening the high-side switches Q1,Q2 and closing the low-side switches Q3,Q4 of the inverter 21. This then enables current in the phase winding 17 to re-circulate around the low-side loop of the inverter 21. Conceivably, however, the controller 26 might instead close the high-side switches Q1,Q2 and open the low-side switches Q3,Q4, so as to allow current to re-circulate around the high-side loop of the inverter 17. The shunt resistors R3,R4 of the current sensor 23 would then be located on the upper arms of the inverter 21 in order that current can continue to be sensed during freewheeling.

In the embodiment described above, the direction of current through the phase winding 17 is bi-directional. However, the drive circuit 13 may equally be used to drive current through a uni-directional phase winding. For example, the controller 26 may pull only DIR1 high during a positive half-cycle of the output voltage, and pull only DIR2 high during a negative half-cycle of the output voltage. As a result, current is continually driven through the phase winding in a direction from left to right. Irrespective of whether the drive circuit 13 is used to drive a bi-directional or a uni-directional phase winding, the controller 26 closes a first pair of switches (e.g. Q1 and Q4) during a positive half-cycle of the output voltage in order to drive current through the phase winding in a particular direction, and closes a second different pair of switches (e.g. Q2 and Q3) during a negative half-cycle of the output voltage in order to drive current through the phase winding in the same direction.

The brushless motor 12 of the motor system 10 comprises a single phase winding 17. However, the drive circuit 13 may be used to control brushless motors having additional phase windings. The inverter 21 would then comprise additional arms, each arm being connected to a phase winding and comprising two bi-directional switches connected in series. Accordingly, in a more general sense, the drive circuit 13 may be said to comprise an inverter 21 having two or more arms connected in parallel. Each arm is then connected to a phase winding of the motor 12 and comprises a pair of bi-directional switches.

The motor system 10 described above is just one example of how the AC/AC boost converter 1 might be employed. It will be understood that the converter 1 might be used to power other loads requiring an AC voltage.

The invention claimed is:

1. A drive circuit for a brushless motor, the drive circuit comprising
an AC/AC boost converter and an inverter having two or more bridge arms connected in parallel across the output terminals of the converter, wherein each bridge arm of the inverter is connected to a winding of the brushless motor, wherein the drive circuit further comprises a pair of bi-direction switches, and wherein the AC/AC boost converter comprises:
input terminals for connection to an AC power supply;
output terminals for connection to a load;
an inductor;
a bridge arm comprising a first switch and a second switch;
a capacitor; and
a control circuit for controlling the switches of the bridge arm;
wherein:
the bridge arm and the capacitor are connected in parallel across the output terminals;
the inductor has a first end connected to one of the input terminals and a second end connected to one of an end and a junction of the bridge arm, the junction being located between the two switches;
another of the input terminals is connected to the other of the end and the junction of the bridge arm;
the switches of the bridge arm are bi-directional;
the AC power supply supplies an AC input voltage at the input terminals; and
the control circuit controls the switches of the bridge arm such that an AC output voltage is supplied at the output terminals, the AC output voltage being greater than the AC input voltage.

2. The drive circuit of claim 1, wherein the control circuit opens and closes each of the switches of the bridge arm during each half-cycle of the AC input voltage.

3. The drive circuit of claim 1, wherein the bridge arm has a first state in which the first switch is open and the second switch is closed, the bridge arm has a second state in which the first switch is closed the second switch is open, the inductor is charged by the AC input voltage when the bridge arm is in the first state, energy from the inductor is transferred to the capacitor when the bridge arm is in the second state, and the control circuit controls the switches of the bridge arm such that the bridge arm is toggled between the first state and the second state multiple times during each half-cycle of the AC input voltage.

4. The drive circuit of claim 1, wherein the switches are gallium nitride switches.

5. The drive circuit of claim 1, wherein the drive circuit comprises a controller for controlling the switches of the inverter, and the controller opens and closes each switch of the inverter multiple times during each half-cycle of the AC output voltage.

6. The drive circuit of claim 1, wherein the drive circuit comprises a controller for controlling the switches of the inverter, the controller closes a first pair of switches so as to excite a winding of the brushless motor with the AC output voltage during a positive half-cycle of the AC output voltage to thereby drive current through the winding in a particular direction, and the controller closes a second different pair of switches so as to excite the winding with the AC output voltage during a negative half-cycle of the AC output voltage to thereby drive current through the winding in the same particular direction.

7. The drive circuit of claim 1, wherein the inverter comprises two bridge arms only.

* * * * *